US008692737B2

(12) United States Patent
Watanabe et al.

(10) Patent No.: US 8,692,737 B2
(45) Date of Patent: Apr. 8, 2014

(54) DISPLAY DEVICE INCLUDING LIGHT-TRANSMITTING COVER WITH A LENS PORTION

(75) Inventors: Hisashi Watanabe, Osaka (JP); Satoshi Shibata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 501 days.

(21) Appl. No.: 13/000,693

(22) PCT Filed: Jun. 15, 2009

(86) PCT No.: PCT/JP2009/002710
§ 371 (c)(1),
(2), (4) Date: Dec. 22, 2010

(87) PCT Pub. No.: WO2009/157150
PCT Pub. Date: Dec. 30, 2009

(65) Prior Publication Data
US 2011/0109535 A1 May 12, 2011

(30) Foreign Application Priority Data
Jun. 25, 2008 (JP) ................................. 2008-166458

(51) Int. Cl.
*G09G 5/00* (2006.01)
(52) U.S. Cl.
USPC ................................ 345/1.3; 349/58; 359/448
(58) Field of Classification Search
USPC ................................ 345/1.3; 349/58; 359/448
See application file for complete search history.

(56) References Cited

U.S. PATENT DOCUMENTS

| 6,195,208 | B1 * | 2/2001 | Ngoi et al. ..................... 359/641 |
| 6,927,908 | B2 | 8/2005 | Stark |
| 7,834,921 | B1 * | 11/2010 | Pinto et al. ..................... 348/251 |
| 2006/0007369 | A1 | 1/2006 | Jin et al. |
| 2006/0077544 | A1 * | 4/2006 | Stark ............................. 359/448 |
| 2007/0279391 | A1 * | 12/2007 | Marttila et al. ............... 345/169 |

FOREIGN PATENT DOCUMENTS

JP 05-188873 A 7/1993
(Continued)

OTHER PUBLICATIONS

Official Communication issued in International Patent Application No. PCT/JP2009/002710, mailed on Aug. 25, 2009.
(Continued)

Primary Examiner — Kwang-Su Yang
(74) Attorney, Agent, or Firm — Keating & Bennett, LLP

(57) ABSTRACT

A direct-viewing type display device includes: a display panel having a display region and a frame region provided outside the display region, with a boundary extending along a first direction between the display region and the frame region, the display region having a plurality of pixels arrayed therein; and a light-transmitting cover disposed on the viewer's side. The light-transmitting cover includes a lens portion disposed astride the boundary for refracting a portion of light going out from the display region toward the frame region. The lens portion refracts the light so that light emitted from the plurality of pixels in the display region has a substantially equal pitch on a plane which is perpendicular to the first direction. A line of intersection between the plane which is perpendicular to the first direction and a viewer-side surface of the lens portion is a curve which is not a circular arc.

10 Claims, 9 Drawing Sheets

(56) References Cited

FOREIGN PATENT DOCUMENTS

| | | |
|---|---|---|
| JP | 2000-056713 A | 2/2000 |
| JP | 2000-305475 A | 11/2000 |
| JP | 2002-099226 A | 4/2002 |
| WO | 02/42838 A1 | 5/2002 |
| WO | 2008/149449 A1 | 12/2008 |
| WO | 2009/157161 A1 | 12/2009 |

OTHER PUBLICATIONS

Watanabe et al., "Display Device and Electronic Device," U.S. Appl. No. 13/000,687, filed Dec. 22, 2010.

Watanabe et al., "Display Device," U.S. Appl. No. 12/743,882, filed May 20, 2010.

English translation of Official Communication issued in corresponding International Application PCT/JP2009/002710, mailed on Feb. 17, 2011.

\* cited by examiner (a)

(b)

(c)

(a)

(b)

DISPLAY DEVICE INCLUDING LIGHT-TRANSMITTING COVER WITH A LENS PORTION

TECHNICAL FIELD

The present invention relates to a display device, and more particularly to a direct-viewing type display device.

BACKGROUND ART

In recent years, in television sets and display devices for displaying information, attempts of arraying a plurality of display devices (which may be referred to as a tiling technique) are being made. By using this tiling technique, for example, attempts are made at realizing a pseudo large-screen display device. However, using the tiling technique has a problem of visible joints between the plurality of display devices.

This problem will be described by taking a liquid crystal display device for example.

A liquid crystal display device includes a liquid crystal display panel, a backlight device, circuits for supplying various electrical signals to the liquid crystal display panel, and a power supply, as well as a housing in which to accommodate these. The liquid crystal display panel includes a pair of glass substrates and a liquid crystal layer retained between them. On one of the pair of glass substrates, color filter layers and a counter electrode are disposed, whereas on the other glass substrate, TFTs, bus lines, a driving circuit for supplying signals to them, and the like are disposed. Moreover, the liquid crystal display panel has a display region in which a plurality of pixels are arrayed, and a frame region around it. In the frame region, a sealing portion for ensuring that the pair of substrates oppose each other and also sealing and retaining the liquid crystal layer, an implementation of driving circuitry for driving the pixels, and the like are provided. No pixels are arrayed in the frame region. Therefore, the frame region does not contribute to displaying.

When constructing a large screen by arraying a plurality of liquid crystal display panels, no image is displayed in the frame region of each liquid crystal display panel since the frame region of the liquid crystal display panel does not contribute to displaying, so that joints will occur in the image. This problem is not limited to liquid crystal display devices, but is a problem common to direct-viewing type display devices, e.g., PDPs, organic EL display devices, and electrophoresis display devices.

Patent Documents 1 and 2 disclose a display device for displaying a jointless image.

The display devices described in Patent Documents 1 and 2 include a light-transmitting cover on the viewer's side of the display panel. At an edge portion of the light-transmitting cover, its viewer's side surface is curved. The curved portion functions as a lens, and therefore will be referred to as a "lens portion" hereinafter. The lens portion of the light-transmitting cover is provided so as to overlap the frame region of the display panel and a portion of a region of the display region adjoining the frame region. A portion of the display region that overlaps the lens portion will be referred to as a "peripheral display region". Light which goes out from pixels which are arrayed in the peripheral display region is refracted by the lens portion toward the frame region. As a result, an image is also displayed on the front face of the frame region, so that a jointless image is displayed on the entire screen.

CITATION LIST

Patent Literature

[Patent Document 1] Japanese Laid-Open Patent Publication No. 5-188873
[Patent Document 2] Japanese National Phase PCT Laid-Open Publication No. 2004-524551

SUMMARY OF INVENTION

Technical Problem

However, the inventors discovered the following problems when applying the techniques described in Patent Documents 1 and 2 to display devices.

In the display device described in Patent Document 2, a curved cross section of an edge portion of the light-transmitting cover which is disposed on the front face of each display panel presents a circular arc shape, thus resulting in the following problems.

FIG. 13 shows a result of a ray-tracing simulation for a display device 900 having light-transmitting covers 914 and 924, a curved cross section of whose edge portion presents a circular arc shape.

Light which exits the front faces (the upper faces in FIG. 13) of display panels 910 and 920 with a uniform pitch is refracted by lens portions 9141 and 9241 of the light-transmitting covers 914 and 924 in the normal direction of the display device (the upper direction in FIG. 13). The pitch of the refracted points become smaller toward the boundary between the display panels 910 and 920. Therefore, the pitch of the outgoing light also becomes smaller toward the boundary between the display panels 910 and 920. When observed by a viewer, this is visually recognized as a distortion of the image, thus resulting in poor displaying.

On the other hand, Patent Document 1 describes a method where light emitted from electron beams, which are point light sources disposed at a uniform pitch, is allowed to go out on the viewer's side with a uniform pitch by means of a transparent panel, thus displaying an undistorted image. However, the reason why discrete points define the transparent panel shapes that are optimum for the respective emission points is that the technique of Patent Document 1 is directed to a CRT, where each pixel of the display device is a minute emission point. On the other hand, in liquid crystal display devices, PDPs, organic EL display devices, electrophoresis display devices, and the like which are currently in broad use as display devices, each pixel is formed in approximately the entire region excluding a TFT(s) and a bus line(s), thus being more of a surface light source than a point light source. Therefore, an optimum shape for a transparent panel cannot be obtained even if the designing method described in Patent Document 1, which is directed to point light sources, is applied to a liquid crystal display device.

For example, as an application of the method of Patent Document 1, it might be possible to design the shape of a light-transmitting cover by regarding the center point of each pixel of a liquid crystal display device as a point light source. In that case, discretely defined points are connected by straight lines or curves to acquire a light-transmitting cover shape. A light-transmitting cover obtained in this manner may be able to allow light emitted from the center point of each pixel to go out on the viewer's side with a uniform pitch, but the pitch may not necessarily be uniform as to light emitted from any region other than the center point of the pixel, thus causing deviations. In other words, an image distortion occurs.

The present invention has been made in order to solve the above problems, and an objective thereof is to provide a direct-viewing type display device in which a frame region of a display panel is obscured, and which displays an undistorted image. Another objective is to provide a direct-viewing type display device that displays an image which is undistorted and whose joints are obscured in the case of being tiled with a plurality of display panels.

Solution to Problem

A direct-viewing type display device according to the present invention comprises: at least one display panel having a display region and a frame region provided outside the display region, with a boundary extending along a first direction between the display region and the frame region, the display region having a plurality of pixels arrayed therein; and at least one light-transmitting cover disposed on a viewer's side of the at least one display panel, wherein, the at least one light-transmitting cover includes a lens portion disposed astride the boundary for refracting a portion of light going out from the display region toward the frame region; and the lens portion refracts the light so that light emitted from the plurality of pixels in the display region has a substantially equal pitch on a plane which is perpendicular to the first direction, and a line of intersection between the plane which is perpendicular to the first direction and a viewer-side surface of the lens portion is a curve which is not a circular arc.

In one embodiment, the line of intersection is a curve defined by an aspherical function.

In one embodiment, a conic constant k of the aspherical function has a value of 0.38 or more.

In one embodiment, a conic constant k of the aspherical function has a value of 2.4 or less.

In one embodiment, the at least one light-transmitting cover includes, in a portion other than the lens portion, a flat plate portion whose viewer-side surface is composed of a face which is substantially parallel to a display plane of the at least one display panel.

In one embodiment, in the display region, the plurality of pixels are arranged at an equal interval along a second direction which is perpendicular to the first direction.

In one embodiment, a display signal supplied to a pixel emitting light entering the lens portion is uniformly compressed along the second direction relative to a display signal supplied to a pixel emitting light entering the flat plate portion; and a conic constant k of the aspherical function is substantially in accordance with the following equation, where a is a compression rate of the display signal supplied to the pixel emitting light entering the lens portion (0<a<1).

$$k=89.918a^4-194.57a^3+159.82a^2-57.099a+7.1865$$

In one embodiment, a luminance of light entering the lens portion is higher than a luminance of light entering the flat plate portion.

In one embodiment, the display device according to the present invention further comprises a backlight device for emitting light toward the at least one display panel, wherein an intensity of light emitted from the backlight device toward a pixel emitting light entering the lens portion is higher than an intensity of light emitted from the backlight device toward a pixel emitting light entering the flat plate portion.

In one embodiment, a second boundary extends along a second direction between the display region and the frame region, the second direction being perpendicular to the first direction; and the at least one light-transmitting cover includes a second lens portion disposed astride the second boundary.

In one embodiment, the at least one display panel includes two or more display panels arrayed so as to adjoin each other along the first direction or a second direction which is perpendicular to the first direction; the at least one light-transmitting cover includes two or more light-transmitting covers arrayed so as to adjoin each other along the first direction or the second direction; and lens portions of the two or more light-transmitting covers adjoin each other along the first direction or the second direction.

An electronic device according to the present invention is an electronic device comprising two display sections, wherein, each of the two display sections is the display device of the above construction; and one of the two display sections is retained by the other display section so as to be capable of relative rotation.

Alternatively, an electronic device according to the present invention comprises: a first display section having a display region and a frame region provided outside the display region, the display region having a plurality of pixels arrayed therein; and a second display section having a display device of the above construction and being disposed on a viewer's side of the first display section, wherein the second display section is retained so that, as seen from the viewer's side, the second display section is capable of sliding between: a position at which the second display section overlies the first display section; and a position at which the second display section and the first display section adjoin each other and the lens portion of the second display section overlaps the frame region of the first display section.

An electronic device according to one embodiment comprises a third display section having a display device of the above construction and being disposed on a viewer's side of the second display section, wherein the third display section is retained so that, as seen from the viewer's side, the third display section is capable of sliding between: a position at which the third display section overlies the second display section; and a position at which the third display section and the second display section adjoin each other and the lens portion of the third display section overlaps the frame region of the second display section.

Advantageous Effects of Invention

According to the present invention, there is provided a direct-viewing type display device in which a frame region of a display panel is obscured, and which can display an undistorted image. There is also provided a direct-viewing type display device which displays a jointless and undistorted image in the case of being tiled with a plurality of display panels.

DESCRIPTION OF EMBODIMENTS

Hereinafter, an embodiment of the present invention will be described with reference to the drawings. However, the present invention is not limited to the illustrated embodiment.

Figure 1:
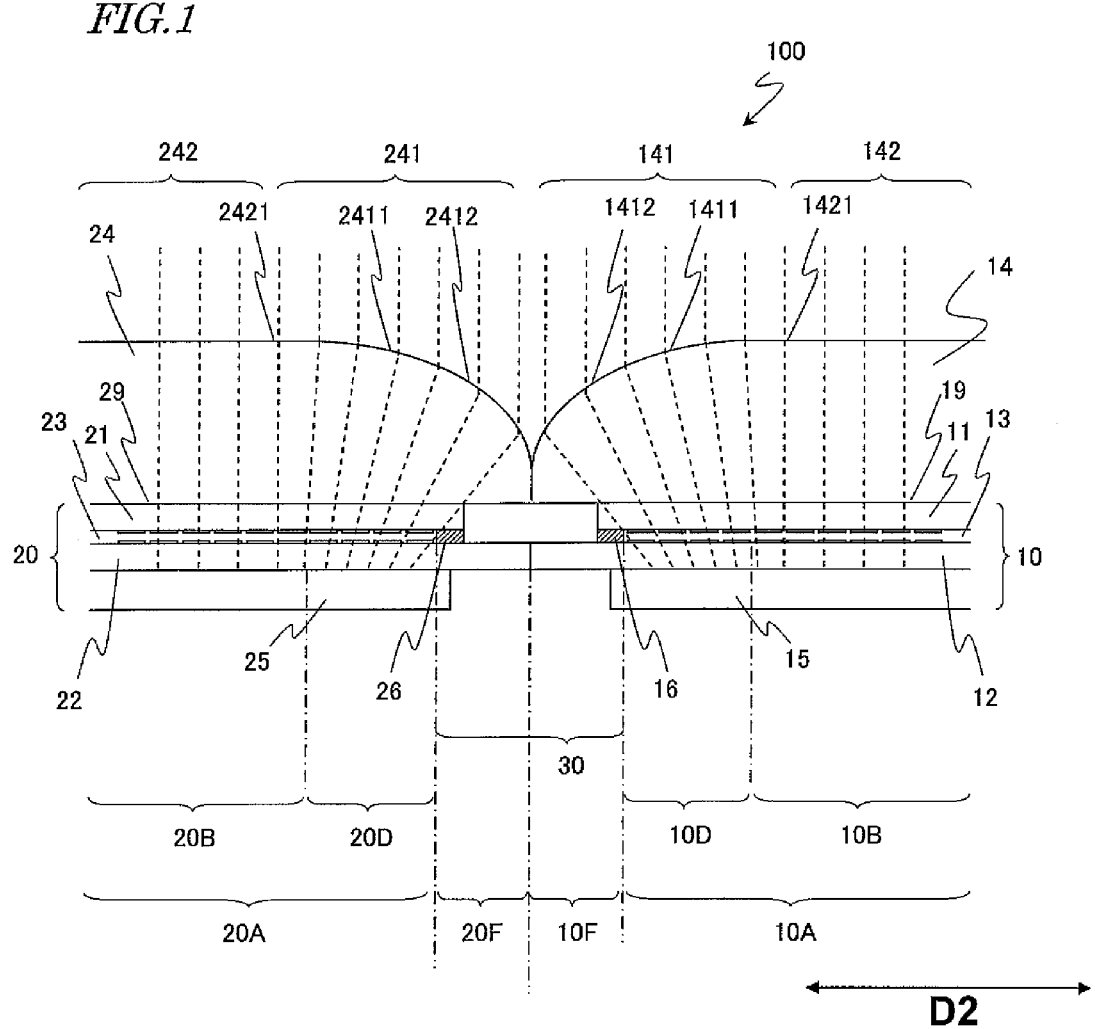
FIG. 1 A schematic cross-sectional view of a display device 100 according to an embodiment of the present invention.

FIG. 1 schematically shows a direct-viewing type liquid crystal display device 100 according to an embodiment of the present invention. FIG. 1 is a schematic cross-sectional view of the liquid crystal display device 100. Although a liquid crystal display device which includes a liquid crystal display panel as a display panel will be illustrated below, a display panel to be used for the display device according to an embodiment of the present invention is not limited thereto. As the display panel, a display panel for a PDP, an organic EL display panel, an electrophoresis display panel, or the like can also be used, for example.

The liquid crystal display device 100 shown in FIG. 1 includes two liquid crystal display panels 10 and 20. Herein, a liquid crystal display device is illustrated in which the liquid crystal display panels 10 and 20 are disposed so as to adjoin each other. Instead of the liquid crystal display panels 10 and 20, it is possible to use a liquid crystal displaying unit which is composed of the liquid crystal display panel 10 accommodated in a housing and a liquid crystal displaying unit which is composed of a liquid crystal display panel 20 accommodated in a housing, such that the liquid crystal displaying units are disposed so as to adjoin each other.

The liquid crystal display panels 10 and 20 include: display regions 10A and 20A in which a plurality of pixels are arrayed; and frame regions 10F and 20F lying outside the display regions 10A and 20A. Any region not contributive to displaying will be collectively referred to as a non-display region 30. The non-display region 30 includes the frame regions 10F and 20F, and if any gap or connecting portion exists therebetween, such a gap or connecting portion also belongs in the non-display region 30. In the display regions 10A and 20A of the liquid crystal display panels 10 and 20, a plurality of pixels are placed in a matrix along a first direction (a normal direction of the display planes 19 and 29 of the liquid crystal display panels 10 and 20) and a second direction D2, which is perpendicular to the first direction and parallel to the display planes 19 and 29 of the display panels 10 and 20 (a horizontal direction of the display planes 19 and 29 of the liquid crystal display panels 10 and 20). The pixels are arrayed at an equal pitch along each of the first direction and the second direction.

The liquid crystal display panel 10 includes an upper substrate 11 and a lower substrate 12, with a liquid crystal layer 13 being provided between the upper substrate 11 and the lower substrate 12. A color filter layer and a counter electrode are formed on the upper substrate 11, for example. On the lower substrate 12, transparent electrodes are formed in a matrix shape, for example, and also, TFTs, bus lines, driving circuits for supplying signals thereto, and the like are provided. Polarizers are respectively disposed above the upper substrate and below the lower substrate (although the polarizers are not shown). Included in the frame region 10F of the liquid crystal display panel 10 are a sealing portion 16 for allowing the liquid crystal layer 13 to be retained between the upper substrate 11 and the lower substrate 12, driving circuitry for driving the pixels, and the like. A backlight device 15 is provided further below the polarizer which is disposed below the lower substrate 12. In the liquid crystal display panel 20, an upper substrate 21, a lower substrate 22, a liquid crystal layer 23, polarizers, a sealing portion 26, and a backlight device 25 are provided, as in the liquid crystal display panel 10. The backlight devices 15 and 25 are direct type backlight devices having a plurality of fluorescent lamps which are parallel to one another, for example.

The light-transmitting covers 14 and 24 are disposed on the viewer's side of the liquid crystal display panels 10 and 20. The light-transmitting covers 14 and 24 include lens portions 141 and 241 and flat plate portions 142 and 242. The lens portions 141 and 241 and the flat plate portions 142 and 242 differ from each other in terms of the shape of their viewer-side surfaces.

The lens portion 141 is disposed astride the boundary extending along the first direction between the display region 10A and the frame region 10F of the liquid crystal display panel 10. Similarly, the lens portion 241 is disposed astride the boundary extending along the first direction between the display region 20A and the frame region 20F of the liquid crystal display panel 20. Stated otherwise, the lens portion 141 is on the viewer's side of a region including a portion of the frame region 10F and portion of a peripheral display region 10D within the display region 10A that adjoins the portion of the frame region 10F along the second direction. Similarly, the lens portion 241 is on the viewer's side of a region including a portion of the frame region 20F and a portion of a peripheral display region 20D within the display region 20A that adjoins the portion of the frame region 20F along the second direction.

Figure 2:
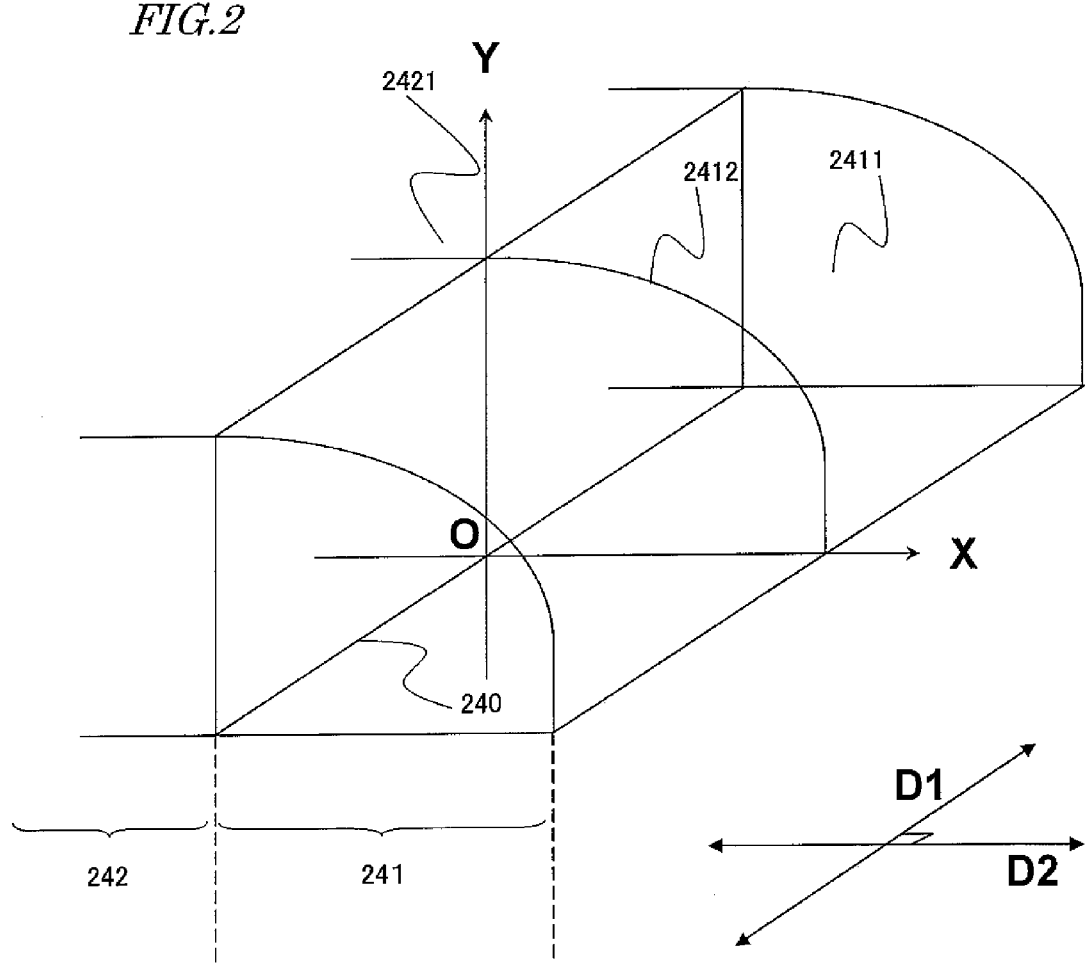
FIG. 2 A schematic perspective view of a light-transmitting cover 24.

FIG. 2 shows a perspective view of the light-transmitting cover 24 of the liquid crystal display device 100 of the present embodiment. As shown in FIG. 2, a line of intersection 2412 between a viewer-side surface 2411 of the lens portion 241 and a plane which is perpendicular to the first direction (D1) (a plane which is parallel to the plane of FIG. 1) is a curve which is not a circular arc. The shape of the viewer-side surface 2411 of the lens portion 241 will be described in detail later.

The lens portions 141 and 241 have a ridge extending along the first direction. By ensuring that the direction in which the ridge extends is substantially perpendicular to the pixel columns of the liquid crystal display panels 10 and 20, i.e., the color filter columns, occurrence of moiré can be suppressed.

The flat plate portions 142 and 242 are on the viewer's side of central display regions 10B and 20B, which are regions of the display regions 10A and 20A excluding the peripheral display regions 10D and 20D. Viewer-side surfaces 1421 and 2421 of the flat plate portions 142 and 242 are substantially parallel to the display planes 19 and 29 of the liquid crystal display panels 10 and 20. Light which goes out from the pixels arrayed in the central display regions 10B and 20B and enters the flat plate portions 142 and 242 travels straight in the flat plate portions 142 and 242 in a direction perpendicular to the display planes 19 and 29 of the liquid crystal display panels 10 and 20, and is emitted on the viewer's side.

Light which is emitted from the peripheral display regions 10D and 20D of the liquid crystal display panels 10 and 20 enters the lens portions 141 and 241, and is emitted toward the viewer's side from either the regions of the lens portions 141 and 241 that are on the viewer's side of the frame regions 10F and 20F or regions that are more outside therefrom (i.e., toward the joint between the liquid crystal display panels 10 and 20). The light which is emitted from the lens portions 141 and 241 is refracted in a direction perpendicular to the display planes 19 and 29. Thus, since the light emitted from the peripheral display regions 10D and 20D of the liquid crystal display panels 10 and 20 is refracted, an image is displayed on the front faces of the frame regions 10F and 20F. As a result, the frame regions 10F and 20F are obscured. Moreover, the non-display region 30, which will appear as a joint in the image in the case of tiling, is prevented from being visually recognized, so that a jointless image is displayed even in the case where the display panels are used for tiling as in the display device of the present embodiment.

Next, with reference to FIG. 3, the construction of the lens portion 241 of the light-transmitting cover 24 will be described, and it will be described how an undistorted image is displayed by the lens portion 241. Note that the lens portion 141 of the light-transmitting cover 14 disposed on the liquid crystal display panel 10 is symmetric in shape to the lens portion 241, with respect to the border line between the liquid crystal display panels 10 and 20. In other words, the lens portion 141 is symmetric to the lens portion 241 with respect to a plane on which the lens portion 141 abuts the lens portion 241. Therefore, the description will be omitted.

Figure 3:
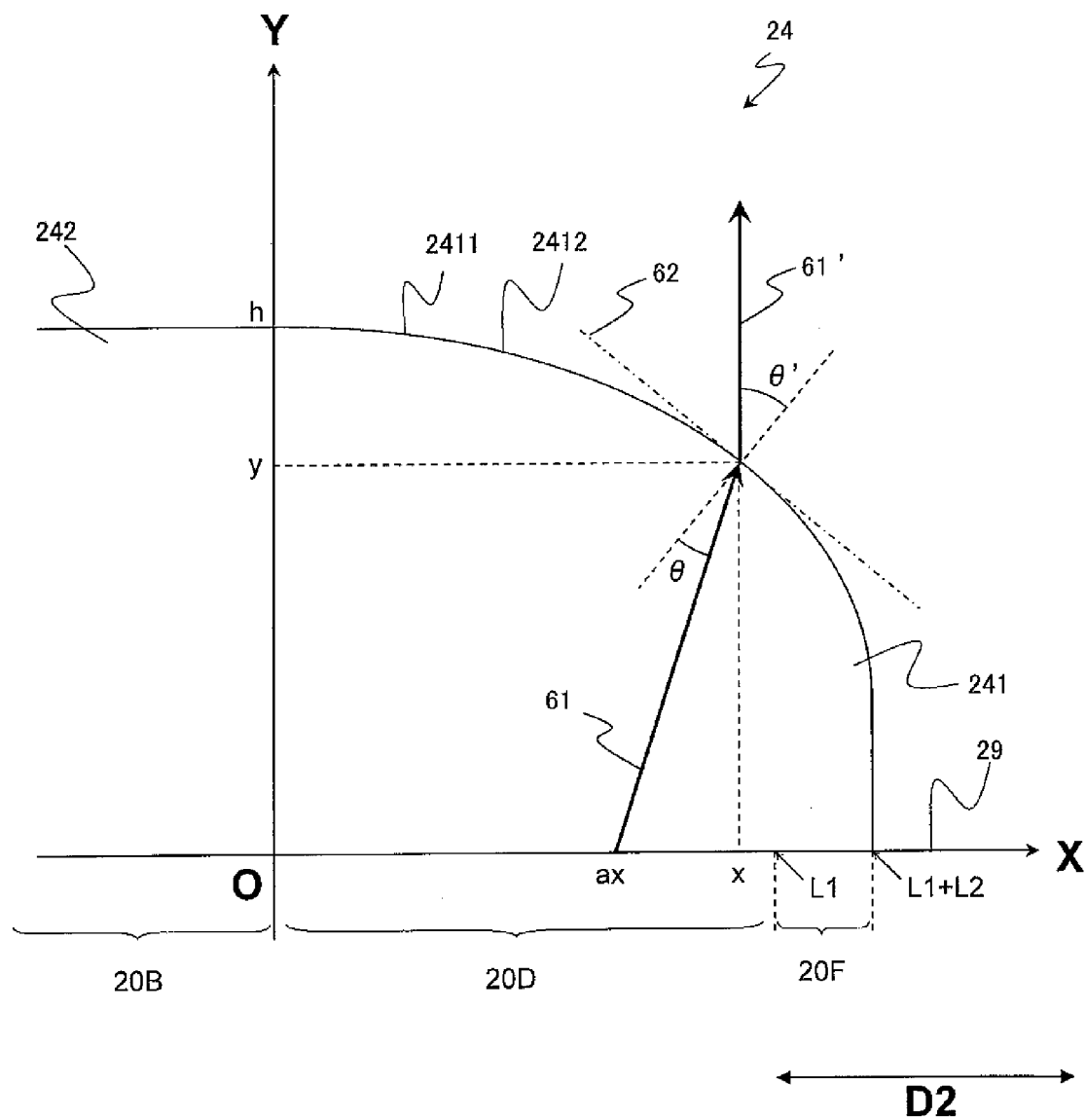
FIG. 3 A diagram schematically showing a lens portion 241 of the light-transmitting cover 24.

FIG. 3 schematically shows the lens shape of the lens portion 241 of the light-transmitting cover 24 to be disposed on the liquid crystal display panel 20.

For the sake of explanation, the origin O, the X axis, and the Y axis are set as shown in FIG. 3. The origin O, the X axis, and the Y axis are also shown in FIG. 2. The origin O is set on a border line (240 in FIG. 2) between the lens portion 241 and the flat plate portion 242 upon the face of the light-transmitting cover 24 facing the liquid crystal display panel 20 (lower side in FIG. 3). The X axis is an axis passing through the origin O and extending along the second direction (D2). As seen from the origin O, the lens portion 241 side (right-hand side in FIG. 3) along the X axis direction is defined as positive on the X axis, the opposite side being defined as negative. The Y axis is an axis passing through the origin O and extending along a direction (up-down direction in FIG. 3) perpendicular to the display plane 29 of the liquid crystal display panel 20. As seen from the origin O, the light-transmitting cover 24 side (upper side in FIG. 3) along the Y axis direction is defined as positive on the Y axis, the opposite side being defined as negative.

In the liquid crystal display panel 20, the peripheral display region 20D exists on the positive side of the X axis from the origin O. Assuming that the width of the peripheral display region 20D is L1, and the width of the frame region 20F is L2, the lens portion 241 is formed in a region defined as X=0 to L1+L2.

Now, an image compression rate a is defined as a=L1/(L1+L2), where a is a constant which is determined from the width L1 of the peripheral display region 20D and the width L2 of the frame region 20F, such that 0<a<1.

Setting the image compression rate a in the above manner means that an image will be displayed on the lens portion 241 in an 1/a times enlarged size. It also means that an image created in the peripheral display region 20D will be compressed by the image compression rate a relative to an image created in the central display region 20B.

Assuming an arbitrary point (x,y) on the line of intersection 2412 between the viewer-side surface 2411 of the lens portion 241 and the XY plane, a ray 61 originating from a given point (ax,0) on the X axis will now be discussed. It is assumed that the point (ax,0) is a point within the peripheral display region 20D (0<ax<L1). The ray 61 enters the lens portion 241, and is emitted toward the viewer's side through the point (x,y), so as to travel in parallel to the Y axis, as indicated by a ray 61' in FIG. 3. Thus, the lens portion 241 refracts rays so that a ray originating from any point on the X axis will travel from the viewer-side surface 2411 in parallel to the Y axis (a direction perpendicular to the display plane 29). The lens portion 241 is designed so that a ray entering the lens portion 241 will be emitted from a point, on the viewer-side surface 2411, whose x coordinate is 1/a times as large as the x coordinate of its incident position.

Figure 4:
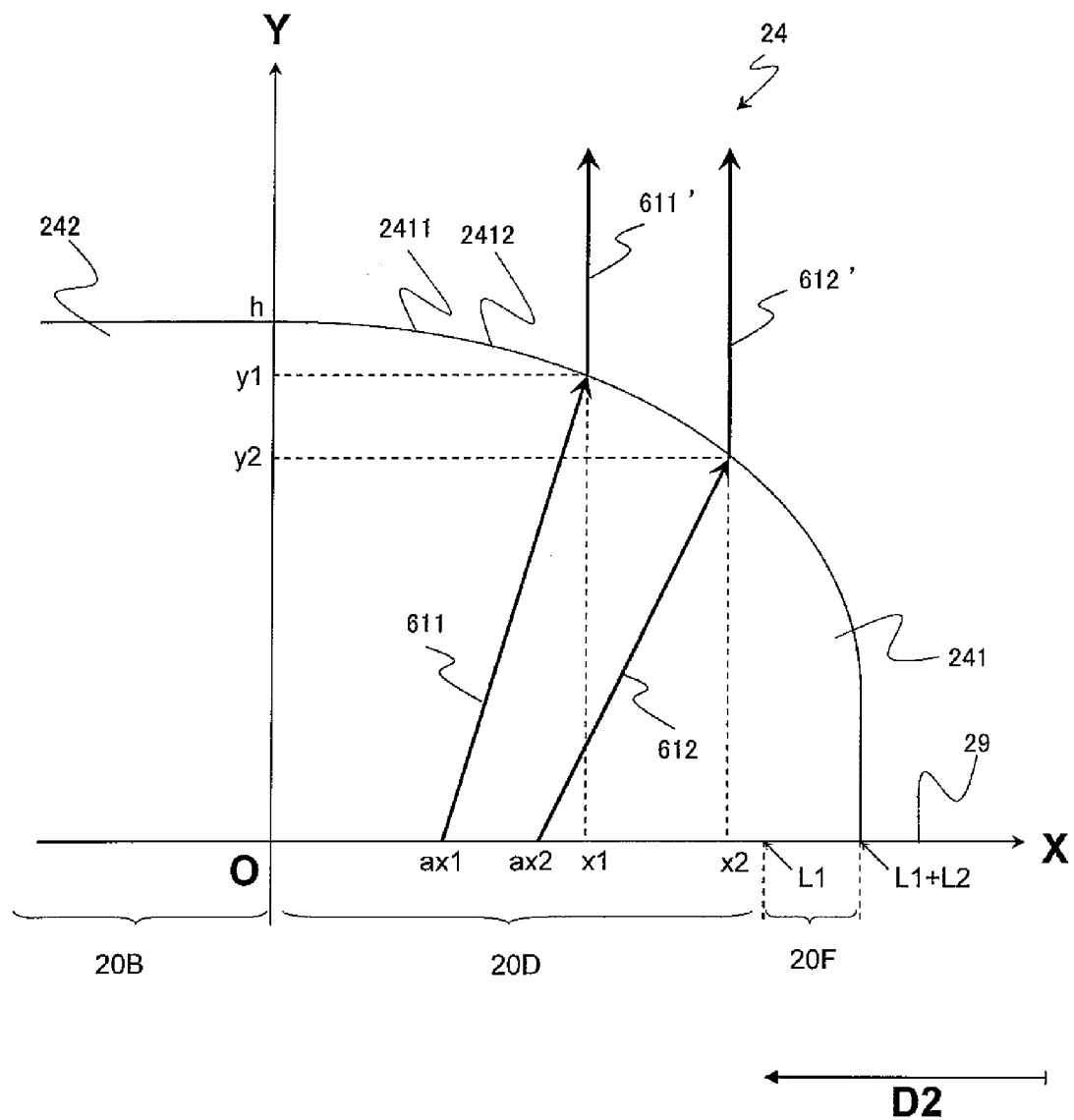
FIG. 4 A diagram schematically showing a lens portion 241 of the light-transmitting cover 24.

With reference to FIG. 4, it will be described how an undistorted image is displayed with the lens portion 241 designed as above. FIG. 4 is a diagram schematically showing the shape of the lens portion 241, similar to FIG. 3. In the description, a ray that is emitted from each pixel will be represented by a ray emitted from its center.

A pixel whose center is at a point (ax1,0) on the X axis emits a ray 611. A ray 611 going out from a pixel adjoining the pixel that emits the ray 611 on the positive side of the X axis is assumed, such that the ray 612 goes out at a point (ax2,0) on the X axis (0<ax1<ax2<L1). The ray 611 enters the lens portion 241 so as to be refracted, and is emitted toward the viewer's side through a point (x1,y1) on the line of intersection 2412, and travels in parallel to the Y axis (ray 611'). Similarly, the ray 612 enters the lens portion 241 so as to be refracted, and is emitted toward the viewer's side through a point (x2,y2) on the line of intersection 2412, and travels in parallel to the Y axis (ray 612'). Herein, (x1,y1) and (x2,y2) are points on the line of intersection 2412 whose X coordinates are x1 and x2, respectively (0<x1<x2<L1+L2).

The interval between the ray 611 and the ray 612 along the X axis direction (second direction D2) is ax2−ax1=a*(x2−x1), and the interval between the ray 611' and the ray 612' along the X axis direction is x2−x1 (where * indicates multiplication). In other words, the interval between rays going out from mutually adjoining pixels within the peripheral display region 20D is enlarged by 1/a times as each ray is transmitted through the lens portion 241.

This is also true of any pixels within the peripheral display region 20D. The interval along the X axis direction between the rays emitted from any pixels adjoining each other along the X axis direction is uniformly enlarged by 1/a times. In other words, the lens portion 241 refracts light so as to substantially equalize a pitch along the second direction D2 of light that is emitted from a plurality of pixels within the peripheral display region 20D of the display region 20A (i.e., the pitch on a plane which is perpendicular to the first direction D1). In the case where the pixels are arranged at an equal interval along the second direction (D2), i.e., the X axis direction, as in the liquid crystal display device 100 of the present embodiment, all rays that are transmitted through the lens portion 241 and emitted on the viewer's side have an equal interval along the X axis direction. In other words, in the liquid crystal display device 100 of the present embodiment, light which goes out of the pixels within the peripheral display region 20D is emitted with a uniform pitch (equal interval) through the lens portion 241. Therefore, in the liquid crystal display device 100 of the present embodiment, an image which is created by the pixels arrayed in the peripheral display region 20D is enlarged by 1/a times along the X axis direction (i.e., the second direction D2) through the lens portion 241, without distortion.

Figure 5:
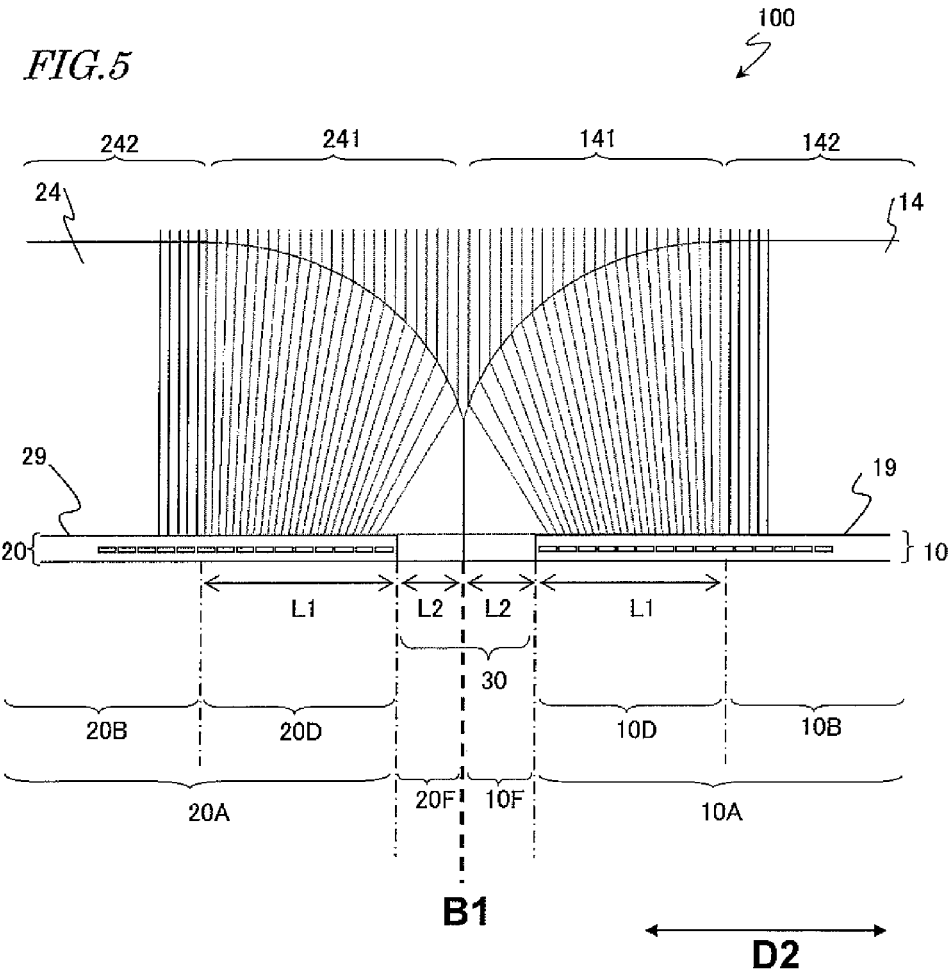
FIG. 5 A diagram explaining a ray-tracing simulation for the display device 100.

FIG. 5 shows results of a ray-tracing simulation, in the liquid crystal display device 100 of the present embodiment, for light which goes out from the liquid crystal display panels 10 and 20 and is transmitted through the light-transmitting covers 14 and 24. Note that the liquid crystal display device 100 shown in FIG. 5 has the same construction as the liquid crystal display device 100 described with reference to FIG. 1.

As shown in FIG. 5, light which goes out from pixels which are arrayed in the central display regions 10B and 20B of the liquid crystal display panels 10 and 20 enters the flat plate portions 142 and 242, goes straight through the flat plate portions 142 and 242 in a direction which is perpendicular to the display planes 19 and 29 of the liquid crystal display panels 10 and 20 so as to go out on the viewer's side, and travels in a direction which is perpendicular to the display planes 19 and 29. Light which goes out from pixels which are arrayed in the peripheral display regions 10D and 20D enters the lens portions 141 and 241, and is refracted outside (toward a border line B1 between the liquid crystal display panels 10 and 20) so as to go out on the viewer's side, and travels in a direction which is perpendicular to the display planes 19 and 29. In this manner, as the light emitted from the peripheral display regions 10D and 20D of the liquid crystal display panels 10 and 20 is refracted, an image is displayed on the front faces of the frame regions 10F and 20F. As a result, the frame regions 10F and 20F are obscured. This prevents the non-display region 30, which might have appeared as a joint in the image in the case of tiling, from being visually recognized, and makes it possible to display a jointless image even when the display panels are used for tiling as in the display device of the present embodiment.

Moreover, as shown in FIG. 5, light which is emitted on the viewer's side from the lens portions 141 and 241 has an equal pitch along the second direction (D2). Moreover, when an image which is created in the peripheral display regions 10D and 20D is compressed by the image compression rate a, the light which is emitted on the viewer's side from the lens portions 141 and 241 and the light which is emitted on the viewer's side from the flat plate portions 142 and 242 have an equal pitch. Therefore, an undistorted image is displayed across the entire screen.

Thus, the liquid crystal display device 100 displays a jointless and undistorted image.

Within the light which goes out of one pixel, the above description refers to the light which goes out of the center of the pixel; however, the above is also true of any two arbitrary rays going out of one pixel, or rays going out of any two arbitrary pixels, within the peripheral display region. The interval between any two arbitrary rays going out of one pixel within the peripheral display region along the second direction is enlarged by 1/a times via transmission through the lens portion. Moreover, the interval between rays going out of any two arbitrary pixels within the peripheral display region is enlarged by 1/a times via transmission through the lens portion.

As described earlier, an image which is created in the peripheral display region 20D is compressed by the image compression rate a relative to an image which is created in the central display region 20B. An image which is created in the central display region 20B is transmitted through the flat plate portion 242, and displayed on the viewer's side without being enlarged or compressed. An image which is created in the peripheral display region 20D is transmitted through the lens portion 241, and displayed on the viewer's side in a 1/a times enlarged size. As a result of this, an undistorted image is displayed by the liquid crystal display device 100.

A shape of the lens portion 241 for enlarging an image created in the peripheral display region 20D by 1/a times can be determined as follows. Note that, as described earlier, as an application of the method of Patent Document 1, when designing a shape for a light-transmitting cover by regarding the center point of each pixel of the liquid crystal display device as a point light source, discretely defined points are connected by straight lines or curves to acquire a light-transmitting cover shape. A light-transmitting cover obtained in this manner may be able to allow light which is emitted from the center point of each pixel to go out on the viewer's side with a uniform pitch, but the pitch may not necessarily be uniform as to light emitted from any region other than the center point of the pixel, thus causing deviations. In other words, an image distortion will occur. Therefore, in order to ensure that the outgoing light has an equal pitch in a display device having pixels which are more like surface light sources, as in a liquid crystal display device, it is required that any arbitrary ray emitted from a surface light source goes out with an equal pitch. In order to obtain an optimum shape for a light-transmitting cover for allowing the light emitted from a surface light source to go out with an equal pitch, it is necessary to express the shape of the light-transmitting cover as a continuous mathematical function. Hereinafter, with reference to FIG. 3, a method for calculating a mathematical function that expresses an optimum shape for the lens portion will be described.

The light 61 going out from a point (ax,0) on the X axis enters the lens portion 241. The ray 61 travels in parallel to the Y axis through a point (x,y) on the line of intersection 2412 between the viewer-side surface 2411 of the lens portion 241 and the Xy plane (ray 61'). The ray 61' is refracted at the point (x,y) according to Snell's law.

Assuming an incident angle of θ, a refraction angle of θ', and a refractive index n of the lens portion 241, the following eq. (1) holds true.

$$\sin \theta' = n \sin \theta \quad (1)$$

An equation f(x) that expresses the line of intersection 2412 (X=0 to L1+L2) is assumed. The gradient of a tangential line line 62 at an arbitrary point (x,y) on the line of intersection 2412 is expressed by f'(x), which is a derivative of f(x), such that the following eq. (2) holds true.

$$f'(x) = -\tan \theta' \quad (2)$$

The gradient of the ray 61 going out from a the point (ax,0) on the X axis can be expressed as follows.

$$\tan(90° + \theta - \theta') \quad (3)$$

Since the ray 61 passes through the point (ax,0) on the X axis and the point (x,y) on the line of intersection 2412, the gradient of the ray 61 can be expressed as follows.

$$y/x(1-a) \quad (4)$$

The function f(x) can be calculated so that eq. (3) and eq. (4) above become are equated in a region defined as X=0 to L1+L2.

A result obtained by employing the following aspherical function as the function f(x) will be demonstrated.

$$f(x)=h-cx^2/(1+(1-(1+k)c^2x^2)^{1/2})+A_4x^4+A_6x^6+A_8x^8+A_{10}x^{10}+ \quad (5)$$

By differentiating eq. (5), the derivative f'(x) of f(x) is expressed by the following eq. (6).

$$f'(x)=cx/(1-(1+k)c^2x^2)^{1/2}+A_4x^3+6A_6x^5+8A_8x^7+10A_{10}x^9+ \quad (6)$$

Herein, c: curvature of the lens portion 241 (an inverse of the radius of curvature);

h: thickness of the flat plate portion 242; and k: conic constant.

The respective parameters were set as follows.

width L1 of the peripheral display region 20D: 12 mm width L2 of the frame region 20F: 3 mm image compression rate a: 0.8 thickness h of the flat plate portion 242: 13 mm radius of curvature (an inverse 1/c of the curvature c of the lens portion 241): 23 mm refractive index n of the lens portion 241: 1.49 (acrylic resin)

The results are as follows.

$k=1.15$ $A_4=-7.86*10^{-7}$ $A_6=1.89*10^{-8}$ $A_8=-1.62*10^{-10}$ $A_{10}=4.95*10^{-13}$

Figure 6:
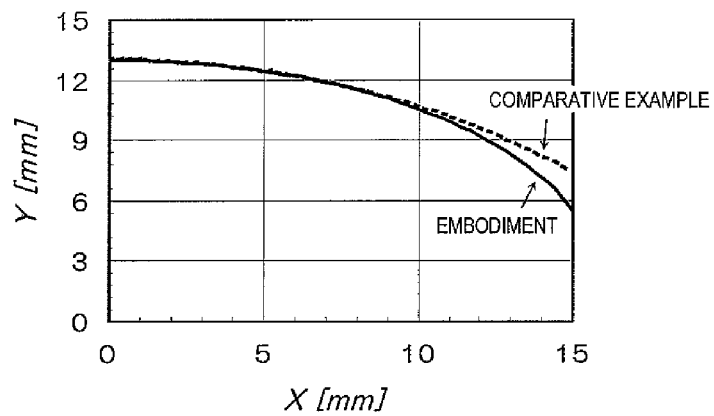
FIG. 6 A graph (solid line) showing the shape of a lens portion of a display device according to an embodiment of the present invention, and a graph (broken line) showing the shape of a lens portion of a display device of Comparative Example.

The lens shape obtained in the above manner is shown in FIG. 6. FIG. 6 is a graph of the line of intersection 2412 as determined by using the aspherical function f(x) (the solid line in FIG. 6).

It is assumed that the pitch of the pixels of the liquid crystal display panel 20 along the X axis direction is 0.1 mm, and that an image which is compressed by the image compression rate a along the X axis direction is created in the peripheral display region 20D. An apparent pixel pitch Δx when viewing an image which is created in the peripheral display region 20D and the frame region 20F through the lens portion 241 having the shape shown in FIG. 6 is shown in FIG. 7.

Figure 7:
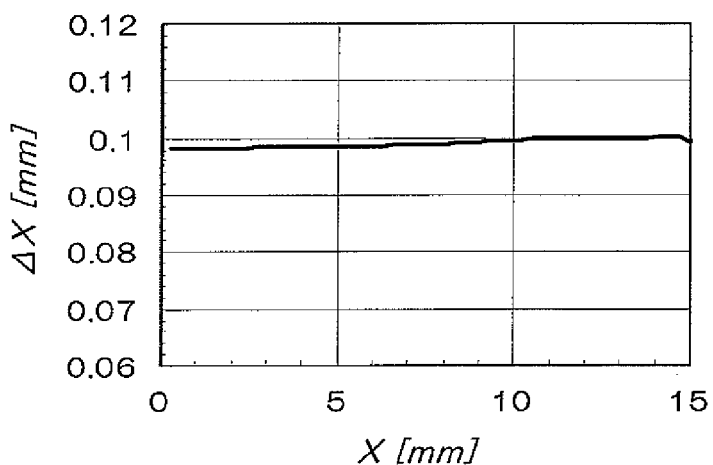
FIG. 7 A graph of an apparent pixel pitch Δx according to an embodiment of the present invention.

From FIG. 7, it can be seen that displaying is attained with the apparent pixel pitch being uniformly enlarged to approximately 0.1 mm in the peripheral display region 20D (X=0 to 12 mm) and the frame region 20F (X=12 to 15 mm).

An image which is created in the central display region 20B has a pixel pitch of 0.1 mm, and an image exiting the central display region 20B and being transmitted through the flat plate portion 242 also has an apparent pixel pitch of 0.1 mm. Thus, the liquid crystal display device 100 of the present embodiment is able to display a uniform and undistorted image across the entire screen.

The shape of the graph of the aspherical function represented by f(x) of eq. (5) is determined by the value of the conic constant k. Therefore, in the aspherical function eq. (5), the value of the conic constant k is important. It has been found through a study that an optimum conic constant k is almost uniquely determined for a value of the image compression rate a.

Figure 8:
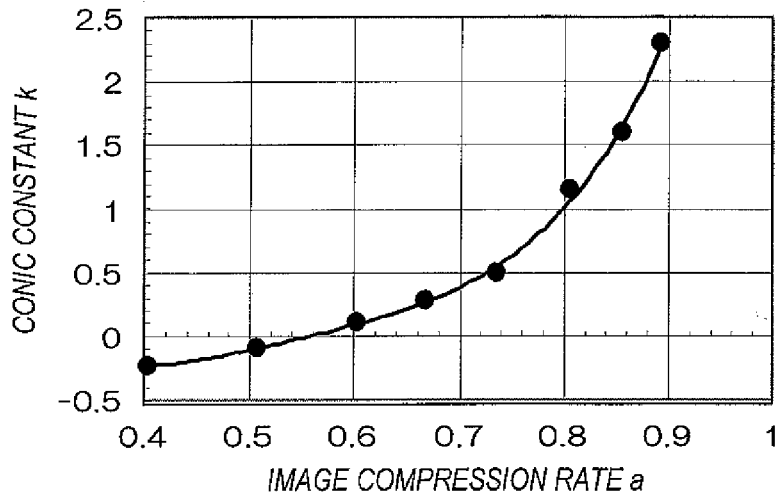
FIG. 8 A graph of an optimum conic constant k (vertical axis) relative to an image compression rate a (horizontal axis).

FIG. 8 is a graph of an optimum conic constant k (vertical axis) relative to an image compression rate a (horizontal axis). The graph of FIG. 8 is obtained from a result by calculating a conic constant k with respect to the following eight image compression rates a, with the following parameters being set:

width L1 of the peripheral display region 20D: 12 mm width L2 of the frame region 20F: 3 mm image compression rates a: 0.40, 0.51, 0.60, 0.67, 0.74, 0.81, 0.86, 0.89 thickness h of the flat plate portion 242: 13 mm radius of curvature (an inverse 1/c of the curvature c of the lens portion 241): 23 mm refractive index n of the lens portion 241: 1.49 (acrylic resin).

The equation of an approximation curve of the graph of FIG. 8 is as follows.

$$k=89.918a^4-194.57a^3+159.82a^2-57.099a+7.1865 \quad (7)$$

By designing the lens portion 241 while calculating the conic constant k in accordance with eq. (7) above, and forming the light-transmitting cover 24, a display device which displays an undistorted image is realized.

Note that the light-transmitting cover is produced by injection molding using an acrylic resin, for example. Due to manufacturing errors, the resultant light-transmitting cover may have a surface configuration such that its conic constant k does not exactly conform to eq. (7). However, sufficient effects will be obtained so long as the conic constant k of the aspheric surface is generally in accordance with eq. (7). Subjective evaluation may be employed to determine a range where effects are obtained.

Next, preferable value ranges for the image compression rate a, and the conic constant k to be calculated from the image compression rate a based on eq. (7), will be described.

If the image compression rate is low (e.g. a<0.7), the 1/a value will be large, so that each pixel will be greatly enlarged. As a result, the black matrix between pixels may be conspicuous, often resulting in poor displaying.

On the other hand, if the image compression rate is high (e.g. a>0.9), a lens portion that is large relative to the width of the frame region will be required, which is not very preferable.

For example, in the case where the image compression rate a=0.95, the equation defining the image compression rate dictates that a=L1/(L1+L2)=0.95, and thus the width (L1+L2) of the lens portion is 20 times as large as the width L2 of the frame region. If the width L2 of the frame region is 3 mm as in the above example, a lens portion must be produced such that the width L1+L2 of the lens portion is 60 mm. In the case of display devices for use in mobile phones and the like, for example, the device width is often 60 mm or less, which makes it impossible to dispose any lens member having a lens portion whose width L1+L2 is 60 mm.

Therefore, the image compression rate a is preferably about 0.7 to 0.9. By using eq. (7), the conic constant k at the image compression rate a=0.7, 0.9 is each calculated to be k÷0.38, 2.4. Thus, the preferable range of the conic constant k is from 0.38 to 2.4.

It will be appreciated that the effects of the present invention will not be lost even outside the aforementioned ranges.

Note that, since the image compression rate a is in the range of 0<a<1, the value of the conic constant k is in the range of 0<k<5.26. This k range is obtained by calculating the k at a=0, 1 from eq. (7).

Next, an image compression method will be described.

As a method of compressing an image, the present embodiment adopts a method where the pixel pitch is kept constant and a compressed image is created in the peripheral display region 20D through signal processing. In other words, a display signal to be supplied to the pixels which are arrayed in the peripheral display region 20D is uniformly compressed by a times along the second direction (D2, X axis direction). As a result, an image which is compressed by a times along the X axis direction is created by the pixels which arrayed in the peripheral display region 20D. This method may be implemented in software, for example.

As a method of compressing images, there is a method of varying the pixel pitch along the second direction, for example, which makes the pixel pitch in the peripheral display region narrower than the pixel pitch in the central display region, thus creating a compressed image without performing signal processing. Although this method does not require any special signal processing, it is necessary to previously fabricate specially-designed display panels, thus resulting in problems such as poor versatility and cost. In the display device of the present embodiment, the pixels are arrayed at an equal interval across the entire display region, thus providing an advantage of a simple structure free of the aforementioned problems.

There is also a method where pixels are arrayed at an equal interval and a display signal is compressed at different compression ratios along the second direction to create a compressed image in the peripheral display region. In the display device of the present embodiment, since the shape of the lens portion is designed so as to uniformly enlarge an image along the second direction, the display signal may also be compressed by a constant compression rate along the second direction, thus providing an advantage in that signal processing can be easily performed.

Next, luminance uniformization will be described.

Within light which goes out from the liquid crystal display panel 20, light entering the lens portion 241 is enlarged by the lens portion 241, and therefore has its luminance decreased in accordance with the enlargement rate (1/a) thereof. Therefore, a luminance difference occurs between the image which is displayed on the lens portion 241 and the image which is displayed on the flat plate portion 242.

Such a luminance difference can be improved by increasing the luminance of the light entering the lens portion 241 relative to the luminance of the light entering the flat plate portion 242. This is realized by increasing the luminance of the light which is emitted from the peripheral display region relative to the luminance of the light which is emitted from the central display region.

In the liquid crystal display device 100, the following two methods are possible for increasing the luminance of the light going out from the central display region.

Method a: Decrease the transmittance of the pixels which emit light entering the flat plate portion.

Method b: Make the luminance of the light emitted toward the lens portion higher than the luminance of the light emitted toward the flat plate portion.

Method a can be easily realized by adjusting the voltage which is supplied to the pixels. As for Method b, in the case where cold-cathode tubes are provided as the backlight device 25, for example, those cold-cathode tubes disposed corresponding to the peripheral display region 20D may be activated so as to be brighter than the other cold-cathode tubes (cold-cathode tubes disposed corresponding to the central display region 20B). A similar method can also be used in the case where light-emitting diodes (LEDs) are arranged side by side as backlight devices. It will be appreciated that the above Methods a and b may be combined to perform luminance uniformization.

In the case where the display panel is a self-light-emitting type display panel such as a plasma display panel (PDP) or an organic EL display panel (OLED), the luminance of those pixels which emit light entering the flat plate portions may be made relatively small.

In the above description, a lens portion 141 or 241 disposed astride the boundary extending along the first direction is provided on the light-transmitting cover 14 or 24 of the liquid crystal display device 100 of the present embodiment; however, the positions of the lens portions are not limited thereto. For example, a further lens portion (second lens portion) which is disposed astride the second boundary extending along the second direction may be provided for the each light-transmitting cover. For example, in a display device having a rectangular display panel and a rectangular light-transmitting cover, if the light-transmitting cover further includes a second lens portion which is disposed astride the second boundary, it becomes possible to provide a lens portion in the frame region entirely around the display panel, thus being able to obscure the frame region entirely around the display panel.

In the above description, the liquid crystal display device 100 of the present embodiment includes two liquid crystal display panels 10 and 20. However, a display device according to the present invention may only have one display panel; for example, one display panel may be comprised, and one light-transmitting cover may be disposed on the viewer's side of the display panel. In such a display device, too, an undistorted image can be displayed, with the frame region being obscured. Moreover, a display device according to the present invention may have three or more display panels. For example, three or more display panels may be arrayed along the first direction, and a light-transmitting cover having a lens portion which is disposed astride a boundary extending along the second direction between the display region and the frame region may be disposed on the viewer's side of each display panel. Moreover, three or more display panels may be arrayed along the second direction, and a light-transmitting cover having a lens portion which is disposed astride a boundary extending along the first direction between the display region and the frame region may be disposed on the viewer's side of each display panel. Moreover, a plurality of display panels may be arrayed in a matrix so as to adjoin one another along the first direction and the second direction, and a light-transmitting cover having a lens portion which is disposed astride a boundary extending along the first direction between the display region and the frame region and a lens portion which is disposed astride a boundary extending along the second direction between the display region and the frame region may be disposed on the viewer's side of each display panel. In either case, an image which is undistorted and whose joints are obscured can be displayed.

The light-transmitting cover 24 of the liquid crystal display device 100 of the present embodiment can be produced with an acrylic resin. However, this is not a limitation; any light-transmitting material can be used, e.g., a transparent resin such as polycarbonate, or glass.

Moreover, although the display panels of the present embodiment are liquid crystal display panels, the display panels are not limited to liquid crystal display panels. A self-light-emitting type display device which lacks a backlight is also applicable.

According to the present invention, good displaying with obscured joints and no distortion can be performed even in a display device in which, unlike in conventional display devices whose pixels can be regarded as point light sources, a plurality of display panels with relatively large pixels that are more like surface light sources are arrayed.

Next, a Comparative Example for the present embodiment will be described.

A display device which is identical to the display device of the above-described embodiment except that the shape of the line of intersection between the viewer-side surface of each lens portion and a plane which is perpendicular to the first direction is a curve in a circular arc shape, instead of a curve which is defined by an aspherical function, is designated Comparative Example.

The respective parameters were set similarly to those of the liquid crystal display device 100 of the present embodiment, as follows.

width L1 of the peripheral display region 20D: 12 mm
width L2 of the frame region 20F: 3 mm
image compression rate a: 0.8
thickness h of the flat plate portion 242: 13 mm
radius of curvature: 23 mm Note that, by setting the following parameters, the aforementioned aspherical function eq. (5) becomes an equation for calculating the shape of a lens portion of a circular arc shape.

$k=0$ $A_4=0$ $A_6=0$ $A_8=0$ $A_{10}=0$

The shape of a line of intersection thus obtained is shown by a broken line in the graph of FIG. 6. Moreover, an apparent pixel pitch Δx of Comparative Example, similar to FIG. 7, is shown in FIG. 9.

Figure 9:
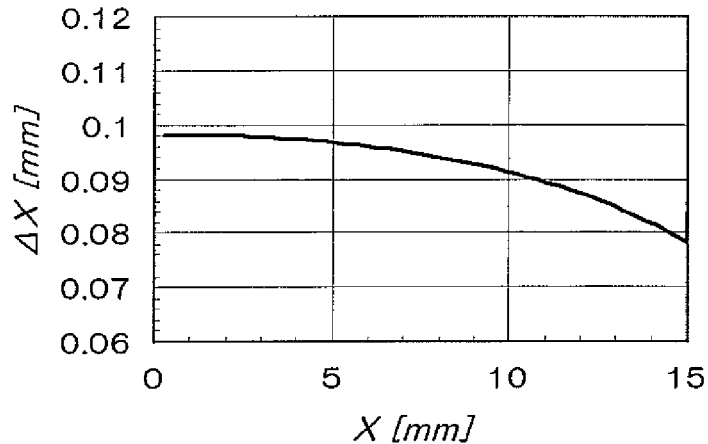
FIG. 9 A graph of an apparent pixel pitch Δx according to Comparative Example.

From FIG. 9, it can be seen that the apparent pixel pitch Δx has a greater deviation from 0.1 mm toward the frame region 20F (i.e., as X increases).

Since the apparent pixel pitch varies along the X axis direction, an image which is displayed on the viewer's side of the light-transmitting cover is an image with significant distortion, resulting in poor displaying.

Next, with reference to FIG. 10 to FIG. 12, various specific examples of electronic devices in which display devices according to an embodiment of the present invention are used will be described.

Figure 10:
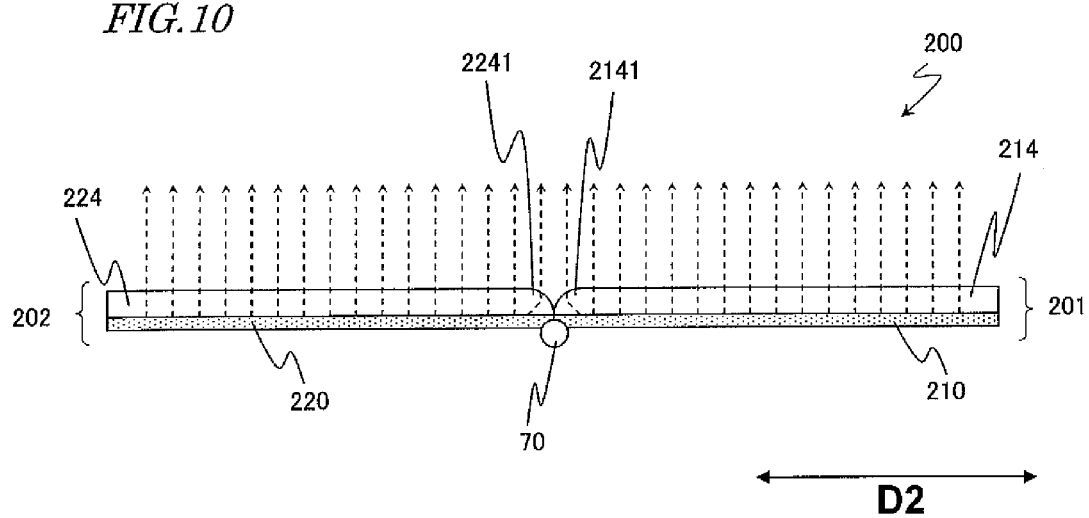
FIGS. 10 (a) and (b) are diagrams showing an electronic device 200 according to an embodiment of the present invention, and (c) is a diagram showing an electronic device 200', where (a) shows an open state; and (b) and (c) show a closed state.
Figure 10:
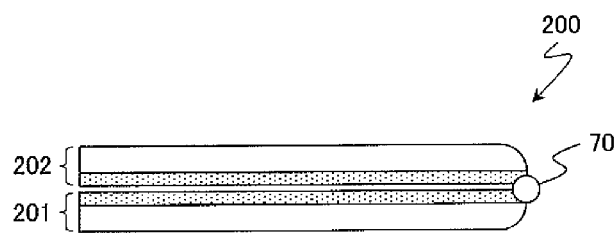
Figure 10:
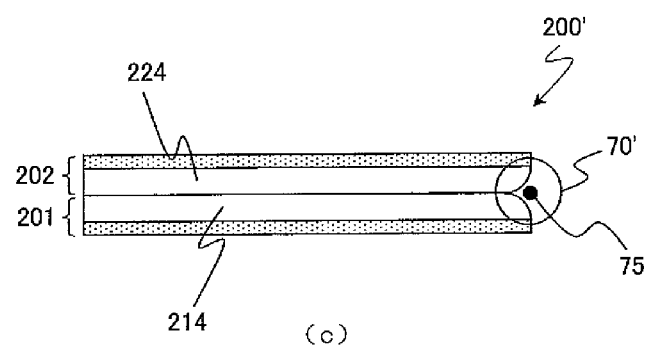

The electronic device 200 shown in FIG. 10 includes two display sections 201 and 202. The display section 201 includes a display panel 210 and a light-transmitting cover 214, whereas the display section 202 includes a display panel 220 and a light-transmitting cover 224. The display section 201 is retained by a hinge 70 so as to capable of rotating relative to the display section 202. The display panels 210 and 220 and the light-transmitting covers 214 and 224 have constructions similar to those of the display panels and light-transmitting covers, respectively, of the display device 100 of the present embodiment described earlier.

By the action of the hinge 70, the electronic device 200 is able to take an open state where the display planes of the display section 201 and the display section 202 lie side by side so as to adjoin each other as shown in FIG. 10(*a*), or a closed state where the display section 201 is in overlying relation with the display section 202 as shown in FIG. 10(*b*). In the open state (FIG. 10(*a*)), the lens portion 2141 of the light-transmitting cover 214 and the lens portion 2241 of the light-transmitting cover 224 lie side by side, so as to adjoin each other along the second direction (D2). As a result, the electronic device 200 is able to display a jointless image. On the other hand, in the closed state (FIG. 10(*b*)), the rear face of the display section 201 (the rear face of the display panel 210) opposes the rear face of the display section 202 (the rear face of the display panel 220); thus, the display section 201 and the display section 202 overlap so that the direction in which the display section 201 displays an image and the direction in which the display section 202 displays an image are opposite. In this closed state, the electronic device 200 can be carried around in a compact form.

In the aforementioned electronic device 200, the center of pivoting of the hinge 70 lies on a plane which is an extension of the rear face of the display section 201 and the rear face of the display section 202. However, the center of pivoting of the hinge 70 may lie on a plane which is an extension of the outermost viewer's side surfaces of the light-transmitting covers 214 and 224. FIG. 10(*c*) shows a schematic cross-sectional view of a closed state of an electronic device 200' in which a center of pivoting 75 of a hinge 70' lies on a plane which is an extension of the viewer-side surfaces of the light-transmitting covers 214 and 224. As shown in FIG. 10(*c*), in the closed state, the electronic device 200' is folded up with the light-transmitting covers 214 and 224 inside, so that the light-transmitting cover 214 side of the display section 201 and the light-transmitting cover 224 side of the display section 202 oppose each other. Although the electronic device 200' does not allow what is displayed on the display device to be visually recognized in the closed state, it is preferable in terms of being able to prevent scratching and soiling of the light-transmitting covers when being carried around.

Figure 11:
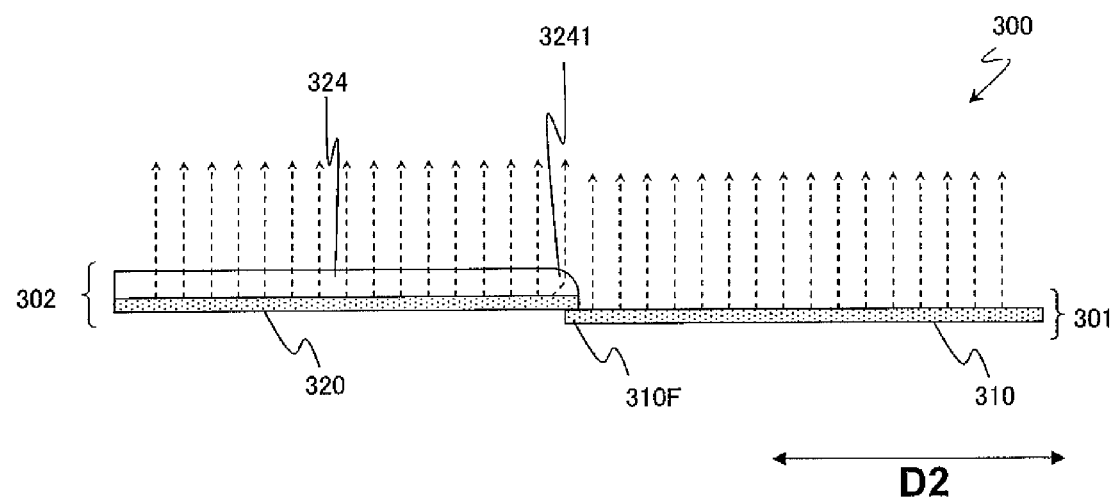
FIG. 11 A diagram showing an electronic device 300 according to an embodiment of the present invention, where (a) shows a case where a display section 301 and a display section 302 lie side by side; and (b) shows a case where the display section 302 overlies the display section 301.
Figure 11:

An electronic device 300 shown in FIG. 11 includes two display sections 301 and 302. The display section 301 includes a display panel 310, whereas the display section 302 includes a display panel 320 and a light-transmitting cover 324. The light-transmitting cover 324 is disposed on the viewer's side of the display panel 320. The display section 302 is disposed on the viewer's side of the display section 301, the display section 302 being constructed so as to slide along the second direction on the display section 301. The display panels 310 and 320 and the light-transmitting cover 324 have constructions similar to those of the display panels and light-transmitting covers, respectively, of the aforementioned liquid crystal display device 100 of the present embodiment.

The display section 302 is retained so as to be capable of sliding between a position at which it adjoins the display section 301 along the second direction (FIG. 11(*a*)) and a position at which it overlies the display section 301 (FIG. 11(*b*)), as seen from the viewer's side. When the display section 302 is at the position where it adjoins the display section 301 along the second direction D2 as shown in FIG. 11(*a*), a lens portion 3241 of light-transmitting cover 324 overlaps a frame region 310F of display section 301. Therefore, the frame region 310F is not visually recognized. Moreover, as shown in FIG. 11(*a*), the lens portion 3241 refracts light which goes out from the pixels within the peripheral display regions of the display panel 320. As a result, an image is displayed on the lens portion 3241. As a result, the electronic device 300 is able to display a jointless image. On the other hand, when the display section 302 is at the position where it overlies the display section 301 as shown in FIG. 11(*b*), the electronic device 300 can be carried around in a compact form.

Figure 12:
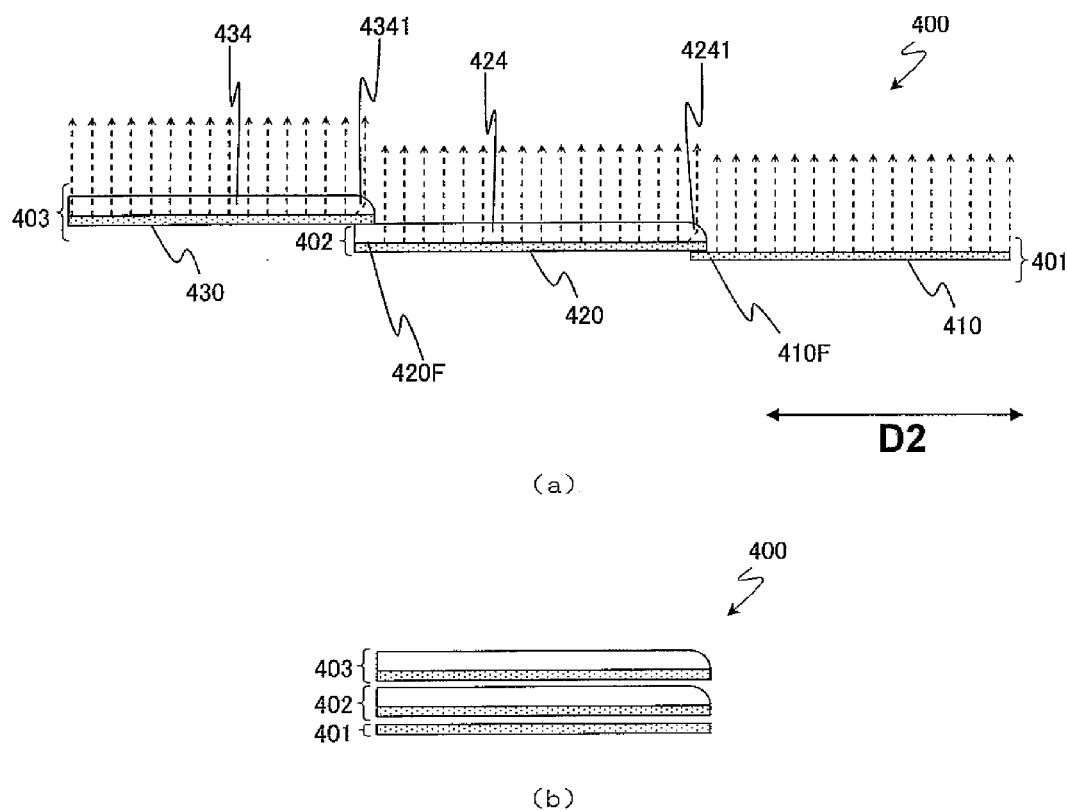
FIG. 12 A diagram showing an electronic device 400 according to an embodiment of the present invention, where (a) shows a case where a display sections 401, 402, and 403 lie side by side; and (b) shows a case where the display sections 401, 402, and 403 overlie one another.
Figure 13:
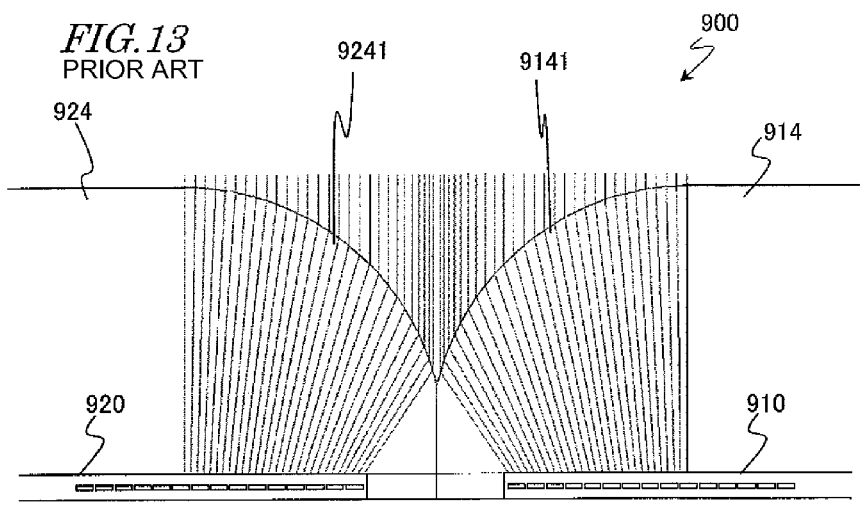
FIG. 13 A diagram explaining a ray-tracing simulation for a display device 900.

An electronic device 400 shown in FIG. 12 includes three display sections 401, 402, and 403. The display section 401 includes a display panel 410; the display section 402 includes a display panel 420 and a light-transmitting cover 424; and the display section 403 includes a display panel 430 and a light-transmitting cover 434. The light-transmitting cover 424 is disposed on the viewer's side of the display panel 420, whereas the light-transmitting cover 434 is disposed on the viewer's side of the display panel 430. The display section 402 is disposed on the viewer's side of the display section 401, whereas the display section 403 is disposed on the viewer's side of the display section 402. The display panels 410, 420, and 430 and the light-transmitting covers 424 and 434 have constructions similar to those of the display panel and light-transmitting covers, respectively, of the aforementioned display device 100 of the present embodiment.

The display sections 401 and 402 are display sections having similar constructions to those of the display sections 301 and 302 of the electronic device 300 shown in FIG. 11, respectively. Similarly to the display section 302 of the electronic device 300, the display section 402 is retained so as to be capable of sliding along the second direction on the display section 401. The electronic device 400 is constructed so as to include a further display section on the viewer's side of an electronic device having a similar construction to that of the electronic device 300. Similarly to the display section 302 of the electronic device 300, the display section 403 is retained so as to be capable of sliding along the second direction D2 on the display section 402.

As seen from the viewer's side, the display section 403 is capable of sliding between a position at which it adjoins the display section 402 along the second direction (FIG. 12(a)) and a position at which it overlies the display section 402 (FIG. 12(b)). As shown in FIG. 12(a), when the display section 403 is at the position at which it adjoins the display section 402 and the display section 402 adjoins the display section 401, a lens portion 4341 of the light-transmitting cover 434 overlaps a frame region 420F of the display panel 420, and a lens portion 4241 of the light-transmitting cover 424 overlaps a frame region 410F of the display panel 410. At this time, similarly to the aforementioned electronic device 300 (FIG. 11), the frame regions 410F and 420F are not visually recognized. Moreover, an image is displayed on the lens portions 4241 and 4341. As a result, the electronic device 400 is able to display a jointless image across the entire display plane. On the other hand, when the display section 403 is at the position where it overlies the display section 402 and the display section 402 overlies the display section 401 (FIG. 12(b)), the electronic device 400 can be carried around in a compact form.

For a slide-type electronic device such as the electronic device 400, at least one display section having a similar construction to that of the display section 403 may be further provided on the viewer's side of the display section 403 of the electronic device 400. Even in such an electronic device, so long as the further display section has the aforementioned sliding construction, a jointless image can be displayed when the display sections lie side by side so as to adjoin each other, and it can be carried around in a compact form when the display sections overlie one another. Thus, by stacking multiple display panels, it becomes possible to realize a display device or electronic device having a large screen and improved portability.

As described above, according to the present invention, with a simpler structure than conventionally, there is provided a display device that displays an undistorted image, in which the frame region of a display panel, or joints in the case of tiling, is obscured. Moreover, a display device according to the present invention is applicable to a display device which realizes a large screen through a matrix connection, and is applicable to a compact electronic device to be carried around for use.

INDUSTRIAL APPLICABILITY

The present invention is suitably used as a television set or as a display device for displaying information.

REFERENCE SIGNS LIST 10, 20 liquid crystal display panel
10A, 20A display region
10B, 20B central display region
10D, 20D peripheral display region
10F, 20F frame region
14, 24 light-transmitting cover
15, 25 backlight device
16, 26 sealing portion
19, 29 display plane of display panel
61, 61', 611, 611', 612, 612' ray
62 tangential line
100 liquid crystal display device
141, 241 lens portion
142, 242 flat plate portion
240 border line between lens portion 241 and flat plate portion 242
1411, 2411 viewer-side surface of lens portion
1412, 2412 line of intersection
1421, 2421 viewer-side surface of flat plate portion
B1 border line between liquid crystal display panel 10 and liquid crystal display panel 20
D1 first direction
D2 second direction

The invention claimed is:
1. A direct-viewing type display device comprising:
at least one display panel including a display region and a frame region provided outside the display region, with a boundary extending along a first direction between the display region and the frame region, the display region having a plurality of pixels arrayed therein; and
at least one light-transmitting cover disposed on a viewer's side of the at least one display panel, wherein
the at least one light-transmitting cover includes a lens portion disposed astride the boundary to refract a portion of light going out from the display region toward the frame region,
the lens portion refracts the portion of light so that light emitted from the plurality of pixels in the display region has a substantially equal pitch on a plane which is perpendicular to the first direction, and a line of intersection between the plane which is perpendicular to the first direction and a viewer-side surface of the lens portion is a curve which is not a circular arc,
the line of intersection is the curve defined by an aspherical function,
the at least one light-transmitting cover includes, in a portion other than the lens portion, a flat plate portion whose viewer-side surface is composed of a face which is substantially parallel to a display plane of the at least one display panel,
in the display region, the plurality of pixels are arranged at an equal interval along a second direction which is perpendicular to the first direction,
a display signal supplied to a pixel emitting light entering the lens portion is uniformly compressed along the sec- ond direction relative to a display signal supplied to a pixel emitting light entering the flat plate portion, and a conic constant k of the aspherical function is substantially in accordance with the following equation, where a is a compression rate of the display signal supplied to the pixel emitting light entering the lens portion (0<a<1):

$$k=89.918a^4-194.57a^3+159.82a^2-57.099a+7.1865.$$

2. The display device of claim 1, wherein the conic constant k of the aspherical function has a value of 0.38 or more.

3. The display device of claim 1, wherein the conic constant k of the aspherical function has a value of 2.4 or less.

4. The display device of claim 1, wherein a luminance of light entering the lens portion is higher than a luminance of light entering the flat plate portion.

5. The display device of claim 1, further comprising a backlight device for emitting light toward the at least one display panel, wherein an intensity of light emitted from the backlight device toward a pixel emitting light entering the lens portion is higher than an intensity of light emitted from the backlight device toward a pixel emitting light entering the flat plate portion.

6. The display device of claim 1, wherein a further boundary extends along the second direction between the display region and the frame region, and the at least one light-transmitting cover includes a further lens portion disposed astride the further boundary.

7. The display device of claim 6, wherein the at least one display panel includes two or more display panels arrayed so as to adjoin each other along the first direction or the second direction, the at least one light-transmitting cover includes two or more light-transmitting covers arrayed so as to adjoin each other along the first direction or the second direction, and lens portions of the two or more light-transmitting covers adjoin each other along the first direction or the second direction.

8. An electronic device comprising two display sections, wherein each of the two display sections is the display device of claim 1, and one of the two display sections is retained by the other display section so as to rotate around the other display section.

9. An electronic device comprising:

a first display section having a display region and a frame region provided outside the display region, the display region having a plurality of pixels arrayed therein; and a second display section having a display device of claim 1 and being disposed on a viewer's side of the first display section, wherein the second display section is retained so that, as seen from the viewer's side, the second display section is capable of sliding between a position at which the second display section overlies the first display section and a position at which the second display section and the first display section adjoin each other and the lens portion of the second display section overlaps the frame region of the first display section.

10. The electronic device of claim 9, comprising a third display section having a display device including at least one display panel having a display region and a frame region provided outside the display region, with a boundary extending along a first direction between the display region and the frame region, the display region having a plurality of pixels arrayed therein, and at least one light-transmitting cover disposed on a viewer's side of the at least one display panel, wherein the at least one light-transmitting cover includes a lens portion disposed astride the boundary for refracting a portion of light going out from the display region toward the frame region, and the lens portion refracts the portion of light so that light emitted from the plurality of pixels in the display region has a substantially equal pitch on a plane which is perpendicular to the first direction, and a line of intersection between the plane which is perpendicular to the first direction and a viewer-side surface of the lens portion is a curve which is not a circular arc, the display device being disposed on a viewer's side of the second display section, and wherein the third display section is retained so that, as seen from the viewer's side, the third display section is capable of sliding between a position at which the third display section overlies the second display section and a position at which the third display section and the second display section adjoin each other and the lens portion of the third display section overlaps the frame region of the second display section.

* * * * *